Figure 1:
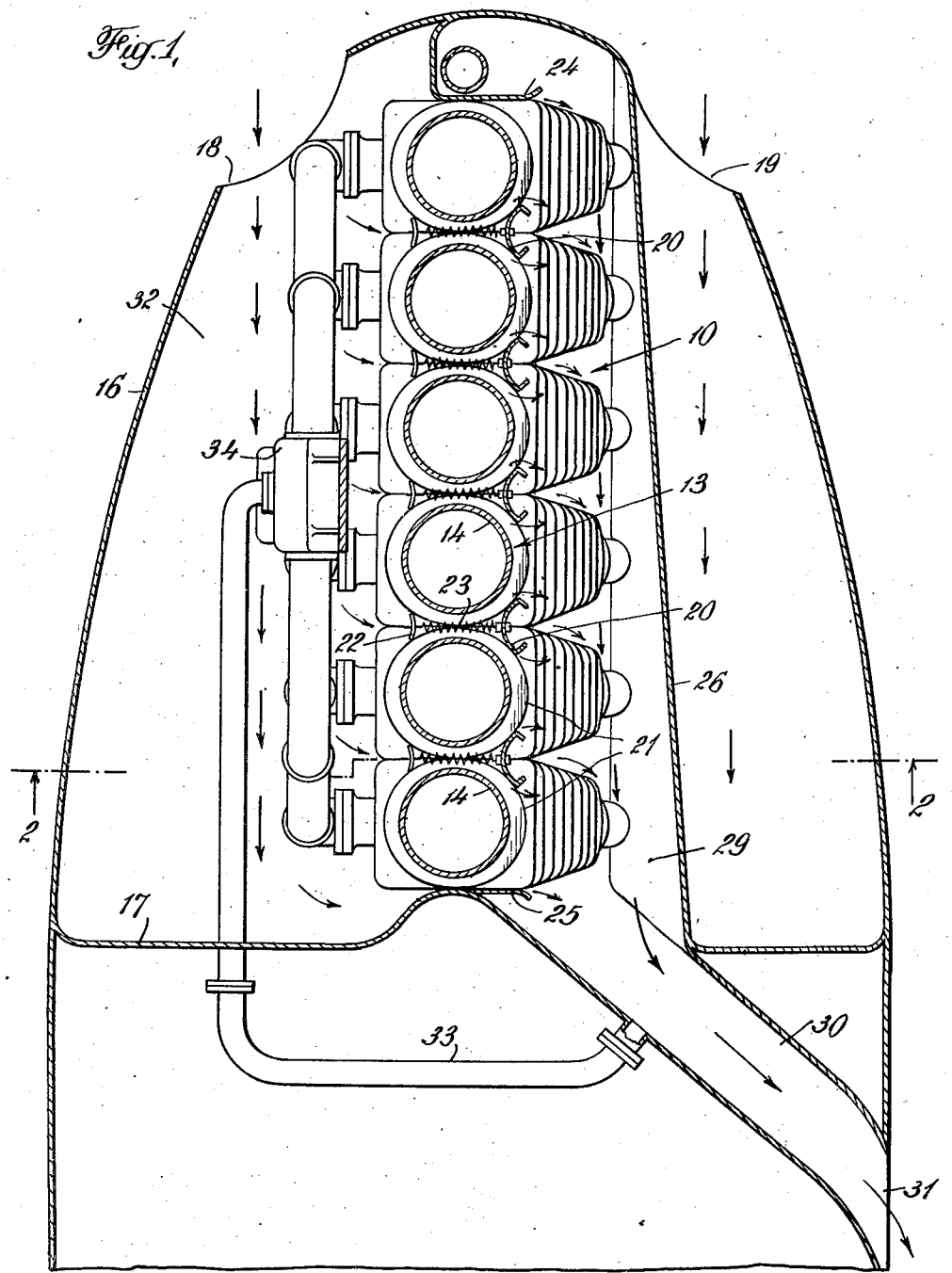

Nov. 17, 1942.                D. B. COX                    2,302,298
                       COOLING SYSTEM FOR ENGINES
                         Filed June 29, 1940         2 Sheets-Sheet 1

INVENTOR
Duncan B. Cox
BY
ATTORNEYS

Nov. 17, 1942.  D. B. COX  2,302,298
COOLING SYSTEM FOR ENGINES
Filed June 29, 1940  2 Sheets-Sheet 2

INVENTOR
Duncan B. Cox
BY
ATTORNEYS

Patented Nov. 17, 1942

2,302,298

UNITED STATES PATENT OFFICE 2,302,298

COOLING SYSTEM FOR ENGINES

Duncan B. Cox, Woodbury, N. Y., assignor to Fairchild Engine and Airplane Corporation, Farmingdale, N. Y., a corporation of Maryland Application June 29, 1940, Serial No. 343,085

8 Claims. (Cl. 123—171)

This invention relates to engine cooling systems, and has particular reference to a system for cooling an entire aeronautical engine by air under static pressure, although the invention is not limited to that use.

It is common practice to cool the cylinders of aeronautical engines by flowing air under pressure over the cylinder barrels and cylinder heads from an air scoop having an opening directed in the direction of movement of the airplane for collecting a portion of the air stream under such conditions that a substantial pressure builds up therein, with the result that the air therefrom flows steadily at high velocity and volume over the cylinder barrels and cylinder head walls to effectively cool the same. However, with this arrangement, major parts of the engine are surrounded by air already heated by the cylinders, resulting in incomplete cooling of those parts. Where an engine operates under extremely high output conditions, the uncooled portions of the engine are considerably heated by conduction from the cylinders through the intervening metal and from other causes. Because these portions are not, there is a larger heat dissipation to the lubricating oil, than would obtain if all or most parts of the engine were surrounded by a cool atmosphere. If this condition continues for a substantial time, the operation of the engine may become impaired, even though the cylinders themselves are effectively cooled in accordance with the aforementioned cooling practice, or modifications thereof.

In accordance with the present invention, an air-cooling system particularly adapted for aeronautical engines is provided, in which the entire engine is surrounded by air under static pressure within an air jacket or scoop, which preferably constitutes the cowling of the engine, this air scoop being entirely closed except for the restricted outlets therefrom leading around the cylinders and through the inter-cylinder spaces, these outlets being of considerably smaller gross area than the area of the air intake opening, so that the aforementioned substantial static air pressure develops. The spent cooling air which passes over the cylinder barrels and cylinder heads is collected and conducted from the engine and air scoop by a duct which connects to exit gills or louvres at a location of relatively low pressure. This duct also lies largely within the cowling and forms part of the engine and engine cowling installation. A part of the warmed spent cooling air which issues from around the cylinders after having performed its cooling function, may be utilized directly for supplying combustion-sustaining air to the carburetor or supercharger, as the case may be.

It will be seen that by subjecting the entire engine to the cooling action of air under pressure in accordance with this invention, all parts of the engine are cooled in addition to the cylinders, which may be cooled in a conventional way by flowing air under pressure thereover through restricted orifices, and the heat of the spent cooling air is not permitted to circulate around the engine but is carried off to atmosphere. Inasmuch as the entire engine is thus sealed within the air scoop or cowling, a fire seal is provided for the engine which seals any fire which might develop from the airplane structure, behind, in front, or around the engine. Furthermore, because the spent cooling air is carried off in a separate duct from the engine, it is also protected from flame within the air scoop or cowling, so that it may be economically utilized as pre-warmed air from carburation without fire liability.

Figure 2:
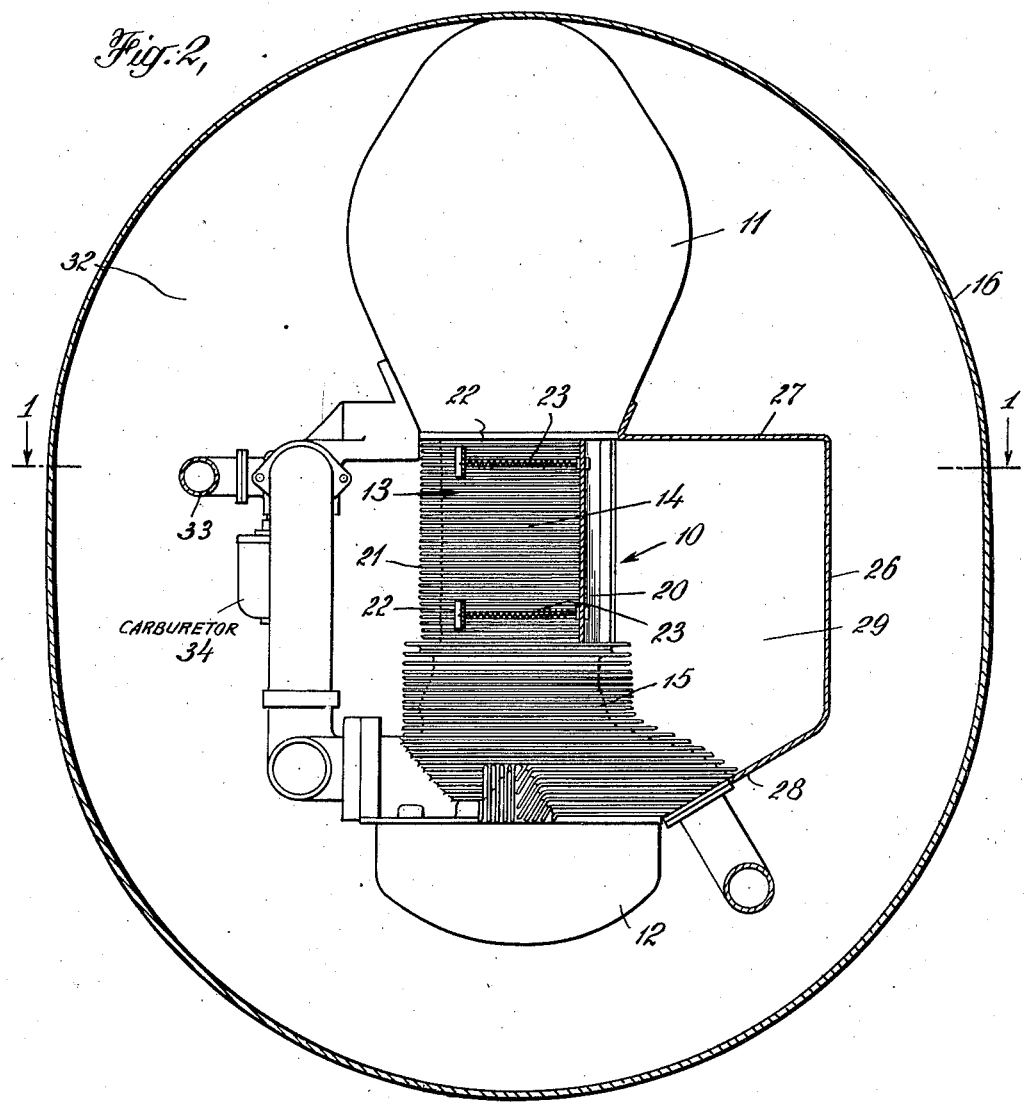

For a more complete understanding of the invention, reference may be had to the accompanying drawings, in which:

Fig. 1 is a horizontal section, partially schematic, through an aeronautical engine of the inverted in-line type, as seen along the line 1—1 of Fig. 2, and illustrates the arrangement of the air jacketing constituting the cooling arrangement of this invention; and Fig. 2 is a vertical section therethrough as seen along the line 2—2 of Fig. 1.

Referring to the drawings, numeral 10 designates an aeronautical engine of the inverted in-line type having crank case 11 and bottom cam-shaft housing 12, between which extend the cylinders 13 comprising cylinder barrels 14 and cylinder heads 15, provided with horizontal cooling fins. The engine shown has six cylinders in line, but a greater or fewer number may be utilized, or the engine may be of the V, H, X, radial, or other type, depending upon requirements.

The entire engine 10 is enclosed or jacketed in a suitable streamline cowling 16, which is closed at the rear by a fire wall 17 and has preferably two air intake openings 18 and 19 at the front, which may be symmetrically located at opposite sides of the engine 10. As illustrated in Fig. 1, the engine cylinders 13 are closely spaced, so that the edges of the fins of adjacent cylinders have relatively small clearance, providing substantially tubular air passages through the inter-cylinder spaces, these passages being defined by the surfaces of adjacent fins and the walls of the corresponding cylinders.

Interposed in the inter-cylinder spaces between the cylinder barrels 14 are baffles 20 which rest on the fins 21. These baffles 20 extend the full height of the cylinder barrels 14, and provide leakage ports of small area between the vertical edges of the baffles 20, the surfaces of the adjacent cylinder barrels 14 and the horizontal surfaces of the adjacent fins 21. The baffles 20 may be resiliently held in place by clips 22 engaging the fins on the opposite sides of the cylinders and connected to the baffles 20 by springs 23. Although not so shown on the drawings, these baffles may also extend between the cylinder heads, or separate cylinder head baffles may be used.

The fins of the leading cylinder 13 are engaged by a baffle plate 24, which extends from the crank case 11 to the camshaft housing 12, that is, the full height of the cylinder 13, including the cylinder barrel 14 and cylinder head 15, so as to provide leakage paths only between the fins. Similarly, the fire wall 17 is extended forwardly to form the baffle plate 25 which extends the full height of the corresponding rear cylinder 13 and provides leakage paths only between the fins of the cylinder barrels 14 and cylinder head 15. As shown in Fig. 2, the cylinder heads 15 are enlarged so that only narrow leakage ports remain between them.

Enclosing the air discharge side of the bank of cylinders 13 so as to collect the spent cooling air passing baffles 20, 24 and 25, is a duct or jacket 26 of any desired shape, depending on requirements. In the particular arrangement shown, the duct 26 has an upper wall 27 secured to, or substantially sealed against, the crank case 11 and a lower wall 28 secured to, or substantially sealed against, the camshaft housing 12, so that the housing thus formed encloses one side of the cylinder bank and constitutes a closed eduction chamber 29 for the spent cooling air. As shown in Fig. 1, chamber 29 preferably increased in cross-sectional area from front to rear in order to accommodate the increasing volume of spent cooling air. Chamber 29 leads to a suitably-shaped exit at a point having lower pressure than the pressure into the cowling. For example, chamber 29 preferably communicates through an opening in the fire wall 17 with a duct 30 leading to a discharge gill 31 located in a low pressure region in the side wall of the cowling 16 or fuselage of the airplane. The duct 30 is sealed and all spent cooling air from eduction chamber 29 passes therethrough.

It will be observed that the cowling 16, fire wall 17, and the eduction chamber 29 form a completely closed air scoop 32, except for the air leakage ports afforded between the cylinder heads 15, and between the cylinder barrels 14 and baffles 20, 24 and 25, the gross area of which is considerably less than the gross area of the intake openings 18 and 19. Accordingly, the air stream entering the air scoop 32 through intake openings 18 and 19 at considerable velocity is trapped within the air scoop 32 and, because the outlets therefrom are relatively small, the air builds up a substantial static pressure within scoop 32. Thus, every exposed part of the entire engine 10, including the crank case 11, the camshaft housing 12, and the like, is completely surrounded by cool air under substantial static pressure.

The air within the air scoop 32, under considerable static pressure, is also in a state of turbulence and circulation, so that all parts of the entire engine are traversed by air and are consequently maintained cool, and the heat conducted thereto from the hotter parts of the engine or otherwise transmitted thereto, is dissipated in the air within scoop 32, raising the temperature of this air to some extent, prior to the time that it flows across the cylinders, which, being much the hottest parts of the engine, still can be satisfactorily cooled by this warmed air.

The air utilized for this purpose is not permitted to remain in the scoop 32, but is carried away rapidly by reason of the pressure on the air and is collected within the closed eduction chamber 29 for discharge to atmosphere through exit gill 31. Consequently the air in scoop 32 remains relatively cool, and is replenished continuously by the air entering intake ports 18 and 19. Exit gill 31 is preferably louvre-shaped so that the air stream flowing thereover creates a suction in duct 30, whereby the differential pressure between scoop 32 and chamber 29 is increased.

If desired, the heated air from the eduction chamber 29 may be used for carburation purposes and to that end a suction pipe 33 may be connected to the discharge duct 30 for withdrawing heated spent cooling air for use in the carburetor 34, or a supercharger, not shown, or for other purposes requiring warmed air. As shown in Fig. 1, the pipe 33 is connected directly to the suction or intake of the carburetor, and it will be understood that it may be similarly connected to a supercharger intake or the like. Although safety requirements sometimes prohibit the use of engine-heated air for carburation purposes, because of the fire liability, nevertheless, in this case the use of the warmed air from eduction chamber 29 is permissible for that purpose, for the reason that it is sealed from the open engine where fire is likely to occur, and hence fire liability is absent in the arrangement of this invention. Also, fire liability is reduced in the arrangement of this invention, since the entire engine is sealed within the air scoop which acts as a fire seal or flame trap from which flash-back into the fuselage is precluded.

Although a preferred embodiment of the invention is illustrated and described herein, it is to be understood that the invention is not limited thereto, but is susceptible of changes in form and detail within the scope of the appended claims.

I claim:

1. In an air-cooled internal combustion engine having a plurality of cylinders, the combination of a sealed air jacket entirely enclosing said engine, a source of air under pressure connected to said jacket, a housing enclosing one side of said cylinders and having a discharge opening, and means forming restricted passages adjacent said cylinders for the flow of air thereover from within said jacket into said housing for discharge through said discharge opening thereof, the volume of air flowing through said passages being less than the volume of air supplied by said source to said jacket whereby a substantial static pressure develops around said engine within said jacket, providing differential pressure between said jacket and housing.

2. In an aeronautical engine having a plurality of cylinders and adapted to be located in an air stream, the combination of a sealed air scoop entirely surrounding said engine and constituting a closed chamber therefor, said scoop having an opening for directing a portion of said air stream into said scoop whereby the entire engine is surrounded by cooling air, a housing enclosing one side of said cylinders, means forming restricted passages adjacent said cylinders for the flow of air thereover from within the scoop into said housing, the gross area of said passages being less than the area of said intake opening whereby a substantial static air pressure develops in said scoop around the entire engine, and means for conducting from said housing and out of said scoop the heated spent cooling air traversing said passages.

3. In an aeronautical engine having a plurality of cylinders, restricted inter-cylinder air passages, and adapted to be located in an air stream, the combination of a sealed air scoop enclosing said engine on all sides, and having an air intake opening for directing a portion of said air stream into said scoop, said intake opening having a greater area than the gross area of said inter-cylinder passages whereby a substantial static air pressure develops in said scoop around the entire engine, and a housing enclosing one side of said cylinders for collecting spent cooling air discharging from said scoop through said inter-cylinder passages over the engine cylinders and conducting it out of said scoop.

4. In an aeronautical engine having a plurality of spaced cylinders arranged in a row, the combination of a substantially tubular cowling surrounding said engine and closed at the rear thereof to form a sealed air scoop entirely enclosing said engine and having an air intake opening for directing a portion of the air stream into said scoop, a housing at one side of said row of cylinders for separating the same from the scoop, means interposed between said housing and the other side of said row of cylinders providing restricted passages for the flow of cooling air over the engine cylinders from said scoop into said housing, the gross area of said passages being less than the area of said scoop intake opening whereby the air stream creates a substantial static pressure within said scoop around the entire engine, and means connected to said housing for conducting therefrom the spent cooling air discharged therein through said restricted passages.

5. In an aeronautical engine having a plurality of cylinders, restricted inter-cylinder air passages, and adapted to be located in an air stream, the combination of a sealed air scoop entirely enclosing said engine, and having an intake opening for directing a portion of said air stream into said scoop, said intake opening having a greater area than the gross area of said inter-cylinder passages whereby a substantial static air pressure develops in said scoop around the entire engine, a housing enclosing one side of said cylinders for collecting spent cooling air discharging from said scoop through said inter-cylinder passages over the engine cylinders and conducting it out of said scoop, means forming an exit gill over which the air stream flows, and connections between said housing and said exit gill for discharging the spent cooling air from said housing.

6. In an aeronautical engine having a plurality of cylinders, restricted inter-cylinder air passages, and adapted to be located in an air stream, the combination of an air scoop entirely enclosing said engine, and having a sealed air intake opening for directing a portion of said air stream into said scoop, said intake opening having a greater area than the gross area of said inter-cylinder passages whereby a substantial static air pressure develops in said scoop around the entire engine, a housing enclosing one side of said cylinders for collecting spent cooling air discharging from said scoop through said inter-cylinder passages over the engine cylinders and conducting it out of said scoop, and louvre-shaped means positioned in said air stream and connected to said housing for creating a suction therein by aspiration.

7. In an aeronautical engine having a plurality of cylinders, restricted inter-cylinder air passages, and adapted to be located in an air stream, the combination of a sealed air scoop entirely enclosing said engine, and having an air intake opening for directing a portion of said air stream into said scoop, said intake opening having a greater area than the gross area of said inter-cylinder passages whereby a substantial static air pressure develops in said scoop around the entire engine, a housing enclosing one side of said cylinders for collecting spent cooling air discharging from said scoop through said inter-cylinder passages over the engine cylinders and conducting it out of said scoop, and a source of suction connected to said housing.

8. In an aeronautical engine having a plurality of cylinders, restricted inter-cylinder air passages, and adapted to be located in an air stream, the combination of a sealed air scoop entirely enclosing said engine, and having an air intake opening for directing a portion of said air stream into said scoop, said intake opening having a greater area than the gross area of said inter-cylinder passages whereby a substantial static air pressure develops in said scoop around the entire engine, a housing enclosing one side of said cylinders for collecting spent cooling air discharging from said scoop through said inter-cylinder passages over the engine cylinders and conducting it out of said scoop, said engine having a carburetor, and means connecting the housing with the air intake of said carburetor for supplying warmed spent cooling air thereto.

DUNCAN B. COX.

CERTIFICATE OF CORRECTION.

Patent No. 2,302,298. November 17, 1942.

DUNCAN B. COX.

It is hereby certified that error appears in the printed specification of the above numbered patent requiring correction as follows: Page 1, first column, line 25, for "not" read --hot--; and second column, line 9, for "uuder" read --under--; line 22, for "from" read --for--; page 3, second column, line 9, claim 6, for "an air scoop" read --a sealed air scoop--; line 10, same claim, for "a sealed air" read --an air--; and that the said Letters Patent should be read with this correction therein that the same may conform to the record of the case in the Patent Office.

Signed and sealed this 29th day of December, A. D. 1942.

(Seal)

Henry Van Arsdale,
Acting Commissioner of Patents.